United States Patent

[11] 3,558,111

| [72] | Inventor | Hazelton H. Avery |
| | | Aurora, Ill. |
| [21] | Appl. No. | 784,417 |
| [22] | Filed | Dec. 17, 1968 |
| [45] | Patented | Jan. 26, 1971 |
| [73] | Assignee | Barber-Greene Company |
| | | Aurora, Ill. |
| | | a corporation of Illinois |

[54] METHOD AND APPARATUS FOR CONTROLLING THE FLOW OF A FLUIDIZED MATERIAL FROM A LOW PRESSURE CHAMBER TO A HIGH PRESSURE CHAMBER
17 Claims, 5 Drawing Figs.

[52] U.S. Cl........................................ 263/21, 34/57, 138/40
[51] Int. Cl......................................... F27b 15/02
[50] Field of Search.............................. 263/21A; 34/10, 57A; 302/29, 53; 138/40

[56] References Cited
UNITED STATES PATENTS

| 2,817,310 | 12/1957 | Ponzini | 302/53X |
| 2,867,429 | 1/1959 | Heath | 263/21A |
| 2,891,846 | 6/1959 | Knight | 263/21AX |
| 3,022,989 | 2/1962 | Pyzel | 263/21AX |
| 3,030,089 | 4/1962 | Johnson, Jr. | 263/21A |
| 3,433,467 | 3/1969 | Thyer | 263/21A |

*Primary Examiner*—John J. Camby
*Attorney*—Hill, Sherman, Meroni, Gross & Simpson ABSTRACT: A method and apparatus for treating material in a fluidized condition including a method and device for transferring material from a fluidized bed in a low-pressure chamber to a high-pressure chamber without disrupting the pressure differential therebetween. The transfer of the material is accomplished by a valve having a large end disposed in the low-pressure chamber and a restricted orifice extending into the high-pressure chamber so that a gaseous medium of the high-pressure chamber entering the orifice will be expanded to decrease its velocity and pressure to allow the passage of material from the low-pressure chamber into the high-pressure chamber.

INVENTOR.
HAZELTON H. AVERY

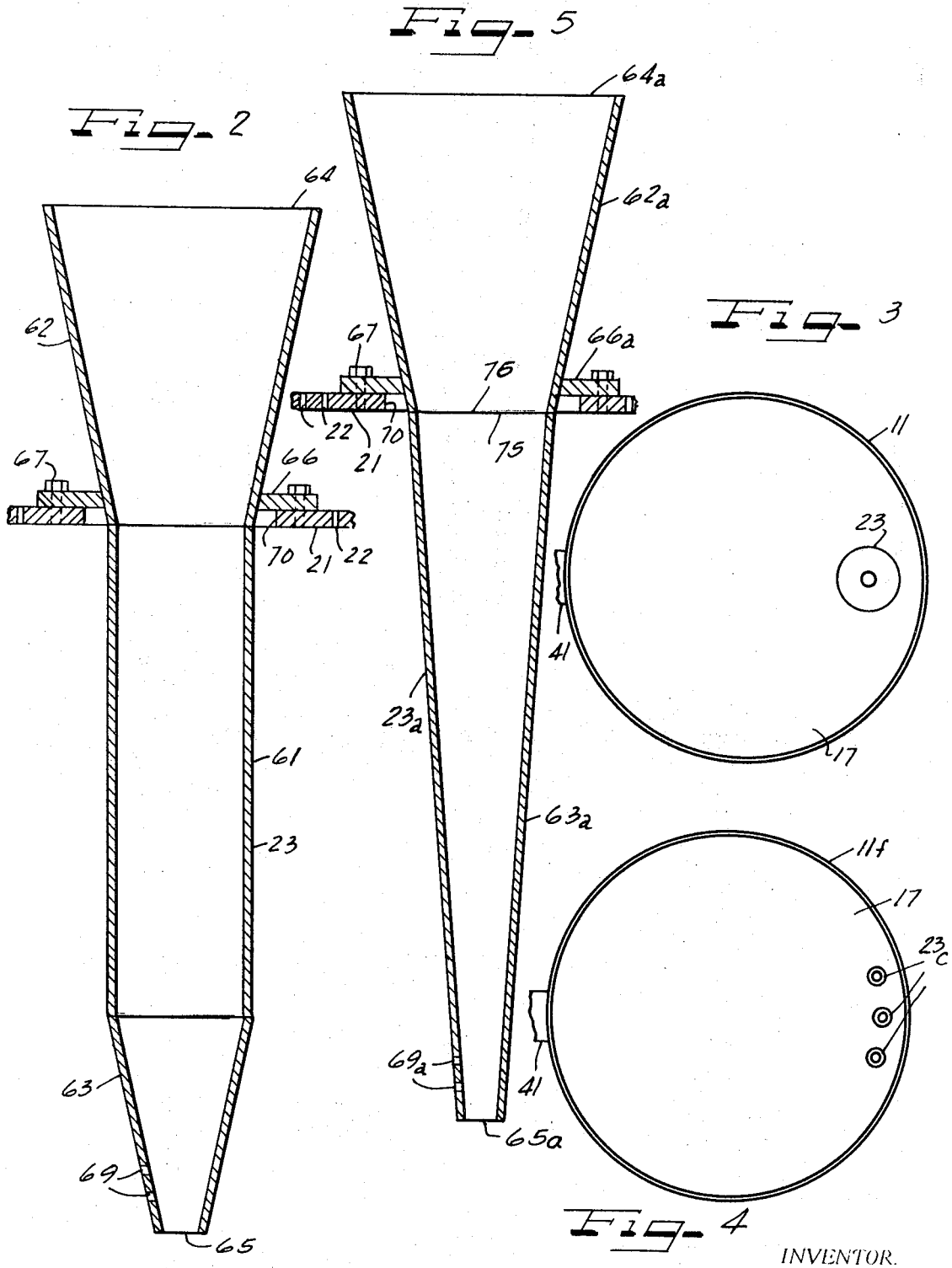

METHOD AND APPARATUS FOR CONTROLLING THE FLOW OF A FLUIDIZED MATERIAL FROM A LOW PRESSURE CHAMBER TO A HIGH PRESSURE CHAMBER

BACKGROUND OF THE INVENTION

1. Field of the Invention

This invention pertains to a method and apparatus for transferring a material from a fluidized bed and in particular transferring the material from a fluidized bed in a low-pressure chamber to a high-pressure chamber.

2. Description of the Prior Art

The use of a fluidized bed created by passing a gaseous medium under pressure through a perforated sheet to cause solid particles or a liquid to be suspended in a flow of the medium in a manner similar to a liquid suspension is a desirable means of treating the solid particles or the liquid. Fluidized beds are particularly useful in an apparatus which treats material in a series of stages. An example is an apparatus having a plurality of superimposed pressure chambers each of which contains a fluidized bed of material. The material is introduced at the top of the apparatus and moves through the chambers and is discharged at the bottom while the gaseous medium flows in the opposite direction to create the fluidized beds and to treat the material. Since a pressure differential exists between each of the chambers, a problem exists at each of the transfer points of the material from the upper bed to the lower chamber which has a high-pressure. The problem has been solved in existing devices by utilizing either a dip tube or a transfer valve.

The dip tube extends from the upper fluidized bed and is projected below the level of the material in the lower chamber or bed to prevent the gas in the lower chamber from entering the tube and passing into the upper chamber which has a lower gas pressure. A disadvantage of the dip tube approach for transferring material between the two pressure chambers is that the apparatus is inoperative until the desired quantities of material are disposed by other means into each of the fluidized bed or chambers to seal the lower end of the dip tube. Therefore a starting material must be used which will not be properly treated since it will not have been processed through each of the successive stages. The starting material has to be discarded as waste material or given a subsequent run through the apparatus. In either case, the incomplete treatment of the starting material increases the cost of starting the apparatus.

The other solution has been the use of a transfer valve which has a conduit sticking through the perforated metal grid between the upper and lower chambers and movable valve parts which control the amount of gas passing through the conduit of the valve from the high-pressure chamber to the low-pressure chamber. Since the material being handled in such an apparatus is continually moving, it is highly abrasive and rapidly wears the moving valve parts which require continual replacement.

SUMMARY OF THE INVENTION

The present invention provides a method and valve for transferring material from a fluidized bed in a low-pressure chamber to a high-pressure chamber without substantially disrupting the pressure differential. The valve is a conduit having an enlarged open end disposed in the low-pressure chamber and a restricted smaller end disposed in the high-pressure chamber so that gas of the high-pressure chamber flowing into the conduit is diffused to decrease its velocity and pressure to allow the material in the low-pressure chamber to flow into and through the conduit into the high-pressure chamber. The invention also includes a material treatment device utilizing the valve and the method to transfer material between a plurality of treatment chambers which utilize fluidized beds.

Accordingly it is an object of the present invention to provide a valve for transferring material from a fluidized bed in a low-pressure chamber to a high-pressure chamber.

Another object of the present invention is to provide a method of transferring material from a fluidized bed in a low-pressure chamber to a high-pressure chamber without substantially disrupting the pressure differential between the low- and high-pressure chambers.

A still further object of the present invention is to provide a valve having no moving parts for transferring material to a high-pressure chamber from a fluidized bed of a low-pressure chamber without substantially disrupting the pressure differential between the high- and low-pressure chambers.

Yet another object of the present invention is to provide an apparatus for treating material in successive fluidized beds and having valves for transferring the material from successive fluidized beds without disrupting the pressure differential existing between each of the fluidized beds.

A still further object of the present invention is to provide a method for treating material in successive fluidized beds and for transferring the material between the successive fluidized beds without disrupting the pressure differential existing between the successive fluidized beds.

Many other features, advantages and additional objects of the present invention will become manifest to those versed in the art upon making reference to the detailed description and accompanying sheets of drawings in which a preferred structural embodiment incorporating the principles of the present invention is shown by way of illustrative example.

ON THE DRAWINGS

FIG. 2 is an enlarged cross section of a transfer valve for transferring material between successive portions of the apparatus of FIG. 1;

FIG. 3 is a cross section taken along line III–III of FIG. 1;

FIG. 4 is a similar cross section to FIG. 3 illustrating the arrangement of the valves for a larger diameter apparatus; and FIG. 5 is an enlarged cross-sectional view of a modification of the transfer valve.

AS SHOWN ON THE DRAWINGS

Figure 1:
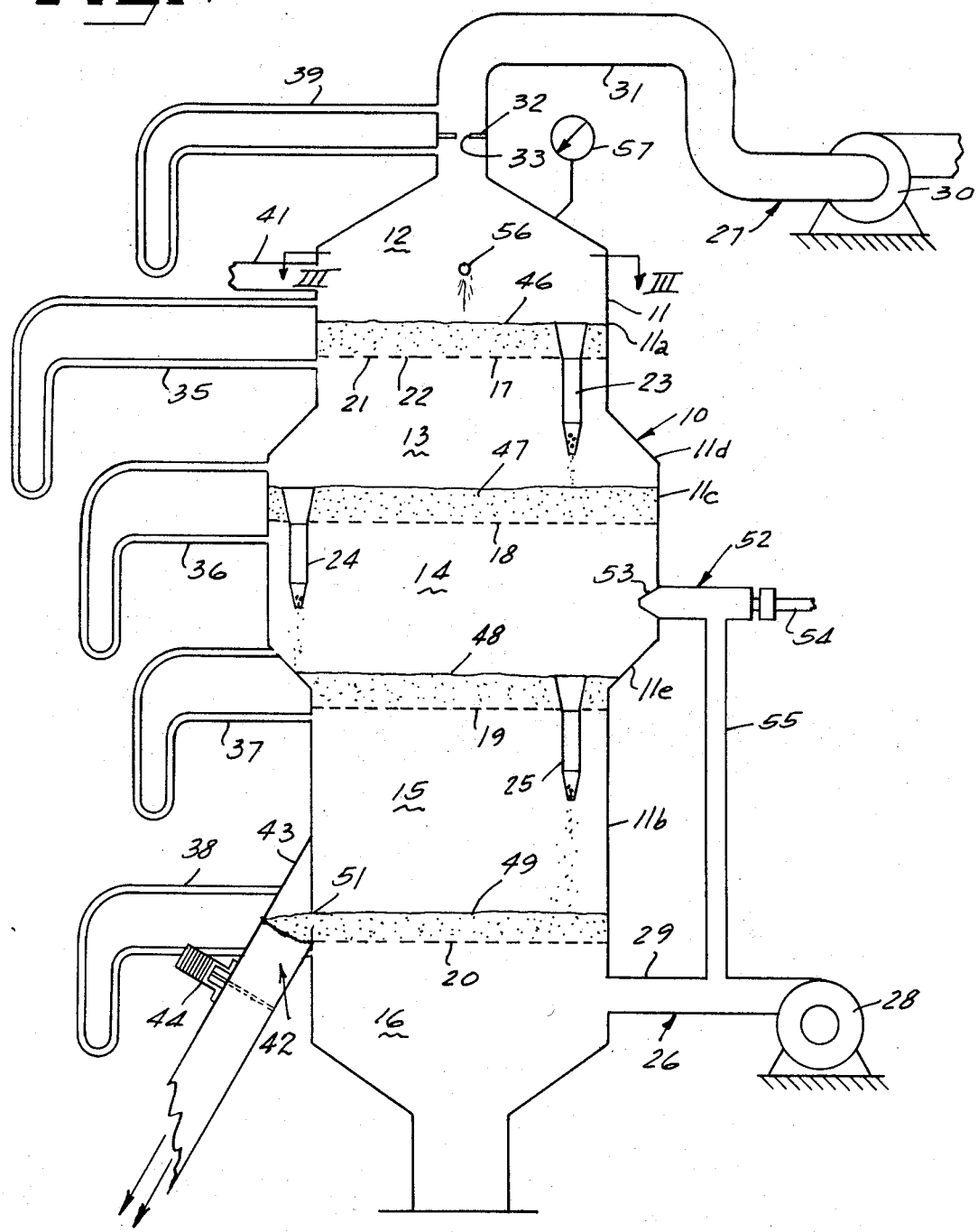
FIG. 1 is a cross section of the material treatment apparatus of the present invention.

The present invention utilizes the principles and properties of a fluidized bed of material which is created by passing a gaseous medium under pressure from a pressure source through openings in a porous grid into a low-pressure chamber. The medium enters the low-pressure chamber in columns or streams associated with each of the openings of the grid. The columns are gradually diffused with a corresponding decrease in the velocity of the medium as the height above the grid is increased. The columns are further diffused by contact with any material such as liquid or solid particles in the chamber. If the openings in the grid are evenly distributed and if the spacing between openings is relatively small, the upper surface of the grid has a continuous upward flow of the gaseous medium with a wide variation of velocities with the greatest velocity being at the centers of the columns and streams.

The material in the low-pressure chamber is placed in a fluidized condition by the flow of the gaseous medium with the direction and velocity of motion of the material determined by the velocity of the medium. If the upward force of the medium is greater than the force of gravity, the particles will be lifted or carried upwardly by the medium; however, in the areas of low velocities, the material will be settling because the upward force is less than the force of gravity. Because the medium is moving in a wide variation of velocities, the material will be moving upward in some areas and settling in other areas to form a fluidized bed of agitated material adjacent the upper surface of the grid. The particles or liquid of the bed are in continuous motion and the bed has a turbulent upper level or surface with projecting spouts or streams of material caused by the high velocity of the center of the column of the gaseous medium. Because of the agitation of the material in the fluidized bed, the material is thoroughly mixed and the bed obtains good chemical reaction and/or rapid heat transfer between the material and the gaseous medium so that the bed reaches an equilibrium temperature.

The principles of the present invention are particularly useful by incorporating the properties of a fluidized bed in a multistage material treatment apparatus or device generally indicated at 10. The apparatus 10 comprises an elongated vessel 11 which comprises cylindrical sections 11a and 11b which are joined to an enlarged cylindrical section 11c by frustroconical sections 11d and 11e. The vessel 11 is subdivided into five superimposed pressure chambers 12, 13, 14, 15 and 16 by four transverse grid means 17, 18, 19 and 20 respectively. Each of the grid means 17—20 extends across the vessel 11 and is a pervious plate 21 having a plurality of openings 22. The grid means 17, 18 and 19 have a material transfer valve 23, 24 and 25, respectively, to transfer material through the respective grid means.

To create a flow of a gaseous medium through the pressure chambers 12—16 of the vessel 11, a gas supply means generally indicated at 26 and a gas exhaust means generally indicated at 27 are provided in the multistage treatment device 10. The gas supply means 26 comprises a blower 28 and a supply duct 29 which is in communication with the lowermost pressure chamber 16 of the vessel 11 to supply the gaseous medium under pressure to the lower portion of the vessel 11. The exhaust means 27 comprises an exhaust blower 30 and an exhaust conduit 31 which is connected to the uppermost pressure chamber 12 at the upper end of the vessel 11. An orifice plate 32 extends across the exhaust conduit 31 to measure the flow of gas therethrough.

The flow of a gaseous medium caused by the gas supply means 26 into the lowermost pressure chamber 16 and then through the pressure chambers 15, 14, and 13 respectively to the uppermost pressure chamber 12 cause each of the chambers to be pressurized. Because of the resistance to the flow of the gaseous medium caused by the grid means 17, 18, 19, and 20, a pressure differential exists across each of the grid means and the pressure in each of the chambers 12—16 decreases as the gaseous medium goes from the lowermost chamber 16 toward the uppermost chamber 12. Therefore, each of the grid means separates two pressure chambers with the upper chamber being a low-pressure chamber while the lower chamber is a high-pressure chamber. For example, the grid means 20 separates the pressure chambers 16 and 15 with the chamber 16 being the high-pressure chamber with respect to the lower pressure of the upper chamber 15 of the grid means 20. But chamber 15 is a high-pressure chamber with respect to the grid means 19 and the next adjacent chamber 14. Thus, chamber 13, 14, and 15 are each high-pressure chambers with respect to its adjacent upper chamber and a low-pressure chamber with respect to its adjacent lower-pressure chamber.

The pressure of the gaseous medium in the uppermost chamber 12 is maintained by the damper adjustments in supply means 26 and exhaust means 27. The orifice 33 creates a resistance to the flow of the medium to create a pressure differential across the plate 32 between the pressure chamber 12 and the pressure in the conduit 31 of the exhaust means.

To measure the pressure differential across the grids 17—20, pressure gauges 35, 36, 37 and 38 are respectively provided and are illustrated as being manometers. A pressure gauge or manometer 39 is provided to measure the pressure differential across the orifice plate 32.

Material is introduced into the vessel 11 by a material supply means 41 which introduces material to the uppermost chamber 12. To remove material which is passed through the vessel, a material discharge means generally indicated at 42 is provided adjacent a lower portion of the vessel 11. As illustrated the material discharge means 42 comprises a conduit 43 having an opening disposed above the grid means 20 to remove material from the pressure chamber 15. The conduit 43 is provided with a valve mechanism 44 which can close or restrict the size of the passageway of the conduit 43 to control the removal of material through the discharge means 42.

In the multistage fluidization device 10, the material introduced into the pressure chamber 12 through the material supply means 41 becomes fluidized adjacent the upper surface of the grid means 17 to form a fluidized bed 46. Material in the bed 46 is transferred to the pressure chamber 13 by passing through the transfer valve 23 which acts to regulate the height of the fluidized bed. Once the material has entered the pressure chamber 13, it enters a fluidized condition above the grid means 18 to form a fluidized bed 47. Material in the bed 47 is then transferred by the transfer valve 24 through the grid 18 into the pressure chamber 14 to form a similar fluidized bed 48 adjacent the grid 19, and the material in bed 48 is transferred passed the grid 19 by the transfer valve 25 and forms a fluidized bed 49 adjacent the grid 20 in the pressurized chamber 15. The material in the bed 49 can be removed from the chamber 15 through the discharge means 42 by flowing through opening 51 which is formed by the junction of the conduit 43 with the vessel 11. Thus material entering through the supply means 41 passes through successive fluidized beds and is finally discharged from the vessel 11 through the discharge means 42.

The multistage fluidization device 10 is provided with a material treatment means generally indicated at 52 which is illustrated as a burner 53. The burner 53 is connected to a fuel supply such as natural gas by a conduit 54 and to an air supply by a conduit 55. In the illustrated apparatus, the gaseous medium supplied by the fan blower 28 is air and the conduit 55 is connected to the conduit 29 to obtain the air supply for the burner 53. A second treatment means 56 which is a water spray nozzle that is attached to a supply of water is positioned in the pressure chamber 12.

The multistage fluidization device 10 as illustrated is designed to treat sand prior to being mixed with a resin in preparation to be formed into sand molds or cores. The apparatus can treat either raw sand or reclaimed sand which is salvaged from previously used sand cores and molds that have been broken up or pulverized.

In the device 10 the burner 53 heats the air in the pressure chamber 14 so that a hot air blast passes through the grid means 18 into the pressurized chamber 13. The pressurized gas in the chamber 13 then passes through the grid means 17 into the chamber 12 and subsequently is exhausted through the orifice plate 32 into the exhaust system or means 27.

Sand introduced into the upper chamber 12 is preheated by the hot gases passing through the grid means to an equilibrium temperature of bed 46 which is a preheating fluidized bed. To control the temperature and moisture of the sand, water or other desirable fluids can be sprayed onto the fluidized bed 46 from the treatment means 56. Once the sand is treated, it is gradually transferred via the transfer valve 23 to the fluidized bed 47 in which it is heated to a higher equilibrium temperature by the hot gases passing through the grid means 18. Since the gases passing through the grid areas 18 are in contact with the hot combustion products of the burner 53, the equilibrium temperature of the fluidized bed 47 which is a roasting bed is higher than the temperature of the other fluidized bed. While in the fluidized bed 47 the sand particles are roasted to removed any foreign material by oxidation. The roasting causes the resins from reclaimed molding sand to be either burned or boiled off from the sand so that the remaining material is of the desired cleanliness.

After being roasted in the bed 47, the sand is then transferred to the next lower bed 48 which is fluidized by a substantially cooler air supply coming from the pressure chamber 15. The bed 48 is considered a first cooling bed and the sand quickly reaches the equilibrium temperature of that bed and is then transferred via the transfer valve 25 to the lowermost fluidized bed 49 which is the final or second cooling bed.

The fan blower 28 of the gaseous supply means in the above described apparatus is pumping cool or cold air into the chamber 16. Thus the fluidized bed 49 will assume an equilibrium temperature approaching the temperature of the air passing through the grid 20. Since the sand being transferred to the bed 49 from the bed 48 is at an elevated temperature, there is some warming of the gases as they pass through the fluidized bed 49 so that the equilibrium temperature obtained in the bed 48 will be higher than the equilibrium temperature of the bed 49. Once the gases, which were heated by passing through both fluidized beds 49 and 48, have escaped from the bed 48, they are heated by the burner to their highest temperature and have a large amount of heat to be transferred to the material in the roasting bed 47. In the process of heating the material in the roasting bed 47, the temperature of the gases is reduced and the gases have less heat for transferring to the material in the preheating bed 46 which assumes a lower equilibrium temperature. The water spray from the treatment means 56 maintains the bed 46 at the desired equilibrium temperature which is indicated on a temperature recording means shown at 57.

When using the above described apparatus for treating foundry sand whether it is raw or reclaimed sand, the gases passing through the roasting bed 47 have a temperature of approximately 1600° F. The gases leaving bed 47 then heat the preheating fluidized bed 46 as they pass therethrough. The water spray from the treatment means 56 controls the temperature in the upper fluidized bed to prevent premature roasting of the foundry sand therein by controlling the equilibrium temperature of the bed.

In the treatment apparatus described above, the temperature limitations for the burner zone and the roasting bed are limited solely by the materials used for constructing the particular device or apparatus. If the material being treated requires a higher temperature, high temperature resistant materials may be used in the construction of the device 10. Thus, the above described apparatus has many applications and has utility for roasting ores.

To insure that the material is present in each of the fluidized beds 46—49 to reach the respective equilibrium temperature, the transfer valve of each grid means 17, 18 and 19 are located to insure that the material introduced to the fluidized bed must move across the bed prior to being discharged from the bed. Therefore, the valve 23 is located diametrically opposite from the material supply means 41 as best illustrated in FIG. 3. The transfer valve 24 is disposed in the grid means 18 diametrically opposite the point at which material passing through the valve 23 enters the fluidized bed 47, as best illustrated in FIG. 1. The transfer valve 25 is disposed in the grid means 19 approximately beneath the valve 23 and the opening 51 of the material discharge means 42 is disposed diametrically opposite of the point of entry for the material introduced to the fluidized bed 49 through the valve 25.

Each of the material transfer valves 23—25 has a cylindrical portion 61 which interconnects an upper portion 62 and a lower portion 63, as best illustrated in FIG. 2. The upper portion 62 has a frustoconical shape diverging to a large opened upper end or weir surface 64. The lower portion 63 has a frustoconical shape converging to a restricted orifice or small lower end 65 which has an area which is substantially smaller than the area of the larger opened end 64.

The transfer valve 23 is secured to the perforated sheet 21 by mounting means comprising an annular flange 66 and fastening means such as bolts 67. As mounted, the upper portion 62 of the transfer valve 23 projects above the upper surface of the perforated sheet 21 while the cylindrical portion 61 extends through an opening 70 in the sheet 21 so that the restricted orifice 65 is positioned beneath the sheet or grid means.

The transfer valve's structure allows the gaseous medium in the lower positioned pressure chamber to enter the orifice 65. Since the inner diameter of the lower portion 63 is diverging from the orifice 65, the gaseous medium expands or diffuses with a corresponding decrease in its pressure and velocity as the gaseous medium passes upwardly through the transfer valve. The diffusion of the gaseous medium across the diameter of the valve 23 is not necessarily even so that the medium in the valve will have various velocities with the greatest velocity extending directly upward from the center of the orifice 65 and the lower velocities being adjacent the inner wall surface of the transfer valve 23. Material in the fluidized bed associated with the grid means 17 falls over the weir surface 64 and passes downwardly through the transfer valve. The gaseous medium passing upward through the valve fluidizes the material which has entered the valve 23. Whether the material in the valve is settling or being carried upward depends upon the velocity of the medium passing through the valve. If the velocity is relatively high, the material will be ejected or spouted back into the fluidized bed from the transfer valve. The structure of the transfer valve is selected so that the velocity of the gaseous medium is decreased to enable the valve to become increasingly filled with fluidized material even though some may be spouted out of the valve. Additionally, the structure of the transfer valve is selected to insure ample fluidizing height within the valved body to maintain an adequate seal against the pressure differential across the valve.

The material passing through the transfer valve 23 while in a fluidized condition offers resistance to the upward movement of the gaseous medium in the valve and forms a seal or barrier of moving material for preventing the gaseous medium of a high pressure from entering the upper chamber and destroying the pressure differential across the grid means 18. Therefore, the shape of the transfer valve and contact of the material in the valve reduces the pressure of the gaseous medium entering the orifice 65 so that it is reduced to substantially the same pressure as the medium of the low-pressure chamber at the time it enters the low-pressure chamber. The material fluidized in the transfer valve 23 acting as a seal as it moves through the valve maintains the pressure differential across the grid means 17.

To insure fluidization of the material in the lower portion 63 of the transfer valve 23 and increase the reliability of the valve, means 69 such as bleed holes or openings are provided to enable additional gaseous medium to enter the transfer valve 24. The bleed openings or holes 69 prevent any bridging or clogging of the material passing through the transfer valve 23 as it approaches the restricted orifice 65.

In charging the apparatus, material is introduced through the supply means 41 to the uppermost pressure chamber 12 and placed in a fluidized condition by the gaseous medium passing through the grid means 17 to form the fluidized bed 46. As the height of the bed 46 builds up, particles of the material start falling over the weir surface of the transfer valve 23 to become fluidized therein. Some of these particles are spouted out by the velocity of the medium passing through the valve; however, as the amount of particles increases, the fluidized particles in the transfer valve form a seal to reduce the amount of spouting. As the seal of particles is formed, the fluidized mass moves downward through the valve to discharge material from the orifice 65 into the pressure chamber 13 to start forming the fluidized bed 47. The formation of the bed 47 occurs in a similar way with discharge of material through the transfer valve 24 into the pressure chamber 14 to form the fluidized bed 48. The fluidized bed 49 in pressure chamber 15 is created after the bed 48 starts discharging material through the transfer valve 25. The height of the fluidized bed 49 is determined by the valve action 44 which senses the differential pressure 38 across the bed 49 and determines the height of bed 49, thus discharging particles which move through the opening 51 and discharge them from the apparatus 10.

The transfer valves 23, 24 and 25 of the treatment apparatus 10 unlike dip tube type transfer means are self-charging and the transfer valves will discharge material regardless of the depth of material in the lower fluidized bed. This advantage is due to the ratio of the open areas between the upper open end 64 and the restricted orifice 65 and to the inner diameter of the transfer valves 23, 24, and 25 increasing from the orifice 65 toward the upper open end 64. The increasing diameter enables the gaseous medium to expand and diffuse with a corresponding decrease in pressure and velocity. The ratio between the upper open end and orifice 65 enables more material to fall into the valve than is spouted out of the valve so that the seal of fluidized material is established in the transfer valves 23, 24, and 25. The cylindrical inner surface of a dip tube transfer means does not enable diffusion of the gaseous medium or enable the formation of the seal of fluidized material. In testing the transfer valve 23, a ratio of a range of 20:1 to 40:1 between the opening 64 and the orifice 65 will obtain the desired results and enables transfer of material through a pressure differential of a range of 3 to 30 inches of water. The straight length section 61 of transfer valve 23 must be long enough to house the depth of fluidized material within the valve which forms the pressure seal across the grid 17.

As shown in FIG. 5, a modification of the material transfer valve 23a, which handles material in the same way as the transfer valve 23, has an upper end portion 62a and a lower end portion 63a which are each frustoconical in shape and are joined together. The upper portion 62a diverges from a small end 75 to the large opened end or weir surface 64a. The small end 75 is joined to the large end 76 of the lower end portion 63a which converges to a restricted orifice or small lower end 65a. Adjacent the lower opened end 65a is a means 69a or bleed opening for adding additional gaseous medium to the transfer valve to insure even flow of the material through the valve. The transfer valve 23a has a mounting means comprising a flange 66a which is secured in an opening 70 in the perforated plate 21 by fastening means such as bolts 67.

FIG. 4 illustrates a cross section view similar to that of FIG. 3 of a vessel 11f which if of a larger diameter and has a larger capacity. Since the vessel 11f has a greater capacity than the vessel 11, the material handled by the transfer valves is increased and the single transfer valve 23 is replaced by a plurality of three transfer means 23c. The use of a plurality of transfer valves 23c of the same size as the valve 23 is preferred instead of using one large valve since a transfer valve large enough to handle the volume of material which the three valves handle would possibly enable a short circuiting of the gas pressure through the large valve to destroy the pressure differential existing between the low-pressure and high-pressure chambers.

Although various minor modifications might be suggested by those versed in the art, it should be understood that I wish to employ within the scope of the patent warranted hereon all such embodiments as reasonably and properly come within the scope of my contribution to the art.

I claim:
1. A material fluidizing apparatus comprising:
a high-pressure chamber of gaseous medium;
a low-pressure chamber of gaseous medium disposed above said high-pressure chamber;
a grid means disposed between said chambers maintaining a pressure differential therebetween, and passing gaseous medium from said high-pressure chamber into the low-pressure chamber to create a fluidized bed of material contained therein adjacent an upper surface of said grid means; and
a material transfer valve having a large open end and a small open end, said valve being mounted on said grid means with said large end projecting into said low-pressure chamber and said small end extending into said high-pressure chamber and positioned above any bed of material therein so that said valve transfers material from said low-pressure chamber to said high-pressure chamber without any substantial disruption of the pressure differential.

2. A material fluidizing apparatus comprising:
a high-pressure chamber of gaseous medium;
a low-pressure chamber of gaseous medium disposed above said high-pressure chamber;
a grid means disposed between said chambers maintaining a pressure differential therebetween, and passing gaseous medium from said high-pressure chamber to said low-pressure chamber to create a fluidized bed of material contained in said low-pressure chamber adjacent an upper surface of said grid means; and
a material transfer valve having a large open end and a small open end, said valve being mounted on said grid means with said large end disposed above said upper surface of said grid means to define a maximum height of the fluidized bed, and with said small open end extending into said high-pressure chamber and terminating above any bed of material therein whereby material of said fluidized bed entering said large open end is transferred to said high-pressure chamber in a fluidized condition creating a seal to prevent a substantial disruption in the pressure differential therebetween.

3. A material fluidizing apparatus comprising:
a high-pressure chamber of gaseous medium;
a low-pressure chamber of gaseous medium disposed above said high-pressure chamber;
a grid means disposed between said chambers maintaining a pressure differential therebetween, and passing gaseous fluid from said high-pressure chamber to create a fluidized bed of material contained in said low-pressure chamber adjacent an upper surface of said grid means;
a transfer valve having an upper end portion diverging to a large open end, and lower end portion converging to a restricted orifice, said valve being mounted on said grid means with said upper end portion disposed above said upper surface of said grid means, and said restricted orifice being disposed in said high-pressure chamber above any bed of material contained therein; and
whereby a gaseous medium under pressure entering said restricted orifice expands in said valve with a corresponding decrease in pressure and velocity so that material entering said large open end is transferred as a moving barrier through said orifice into said high-pressure chamber without causing a substantial disruption of said pressure differential.

4. A material fluidizing apparatus according to claim 3, wherein said lower end portion of said conduit includes means allowing gaseous medium from the high-pressure chamber to enter said valve adjacent said orifice for insuring fluidization of the material adjacent the orifice while being transferred through said valve.

5. A material fluidizing apparatus according to claim 4, wherein said means allowing gaseous medium from the high-pressure chamber to enter said conduit comprise openings formed in said lower end portion adjacent said restricted orifice.

6. A method of transferring fluidized flow of material from a low-pressure chamber to a high-pressure chamber comprising the steps of introducing a high-pressure medium into a low-pressure chamber through a grid means to cause the material in the low-pressure chamber to be fluidized adjacent the grid means, causing the fluidized material to flow through a funnel like structure having an open end disposed above said grid member and to be discharged through a restricted orifice into the high-pressure chamber without causing any substantial disturbance in a pressure differential between the respective low- and high-pressure chambers.

7. A process for treating and reclaiming sand for use in a foundry, comprising the steps of:
fluidizing and preheating the sand in a first fluidized bed;
transferring said sand while in a fluidized condition from said first bed to a second fluidized bed;
roasting the sand in said second fluidized bed to remove all of the impurities and contaminants therein;
transferring said sand in a fluidized condition from said second bed to a third fluidized bed;
cooling said sand in the third bed; and
removing the sand from said third fluidized bed.

8. A process according to claim 1, wherein the step of preheating includes spraying the first fluidized bed with a liquid to control the temperature of the first bed.

9. A process for treating sand comprising the steps of creating a preheating fluidized bed, a roasting fluidized bed and a cooling fluidized bed, and causing sand introduced to said preheating bed to flow therethrough and to be transferred while in the fluidized condition to said roasting bed and then to be transferred from said roasting bed to said cooling bed whereby the sand is preheated, roasted, and cooled while in a fluidized condition to remove impurities and contaminants therefrom.

10. A material fluidizing and treating apparatus comprising:
a high-pressure chamber of gaseous medium;
a low-pressure chamber of gaseous medium disposed above said high-pressure chamber;
a grid means disposed between said chambers maintaining a pressure differential therebetween, and passing gaseous fluid from said high-pressure chamber into said low-pressure chamber to create a fluidized bed of material contained in said low-pressure chamber adjacent an upper surface of said grid means;
treatment means disposed in said apparatus for treating the material in said fluidized bed; and
a material transfer valve having a large open end and a small open end, said valve being mounted on said grid means with said large end projecting above said upper surface into said low-pressure chamber and said small end extending into said high-pressure chamber so that the valve transfers material from said low-pressure chamber to said high-pressure chamber without causing substantial disruption of the pressure differential.

11. An apparatus for fluidizing and treating a material, comprising:
a vessel;
material supply means to introduce material adjacent the top of said vessel;
material discharge means disposed adjacent the bottom of the vessel to remove material from said vessel;
gas medium supply means introducing a gaseous medium adjacent the bottom of said vessel;
a gaseous medium exhaust means for removing the gaseous medium adjacent the top of the vessel to create an upward flow of the gaseous medium through said vessel;
a plurality of grid means extending across the vessel and said upward flow to divide said vessel into a plurality of superimposed pressure chambers, said grid means creating a pressure differential between each adjacent chamber so that pressure is decreased in each chamber as the distance from the bottom of the vessel increases, each of said grid means being able to pass gaseous medium from the lower to the upper surface to create a fluidized bed adjacent an upper surface thereof;
transfer valves disposed in each of said grid means to transfer material from each fluidized bed to the chamber disposed therebelow, said valves having an upper open end projecting above the upper surface of said grid means and a lower restricted orifice extending into the chamber beneath said grid means, said restricted orifices being smaller than the upper end so that material is transferred from an upper pressure chamber across said grid means to a lower pressure chamber without substantially affecting the pressure differential; and
treating means for introducing a treating medium into one of said fluidized beds so that material supplied to said vessel is fluidized and treated.

12. A transfer valve for transferring material from a fluidized bed in a low-pressure chamber to a high-pressure chamber without disrupting the pressure differential therebetween, comprising: an upper portion diverging to the large open end and a lower portion connected to said upper portion and converging to a restricted orifice having an opening area less than the opening area of the large open end whereby a medium of the high-pressure chamber entering said orifice is expanded to reduce the pressure and velocity to permit material to flow through the conduit into the high-pressure chamber.

13. A transfer valve according to claim 12 which includes means adjacent said orifice to enable additional medium to enter said valve to insure fluidization of material in the lower portion.

14. A transfer valve for transferring material from a fluidized bed in a low-pressure chamber into a high-pressure chamber without disrupting the pressure differential existing therebetween, comprising:
a body portion;
an upper portion secured to said body portion and diverging to a large weir surface projecting into said low-pressure chamber; and
a lower portion secured to said body portion and converging to a restricted orifice disposed in the high-pressure chamber.

15. A transfer valve for transferring material from a fluidized bed in a low-pressure chamber into a high-pressure chamber without substantially disrupting a pressure differential existing therebetween, comprising:
an upper portion having a weir opening and converging to a smaller end, said upper portion being disposable in the fluidized bed with the weir opening adjacent an upper level of the bed; and
a lower portion having an upper end secured to said smaller end of said upper portion, said lower portion converging from said upper end into a restricted orifice being disposed in said high-pressure chamber.

16. A transfer valve for transferring material from a fluidized bed in a low-pressure chamber to a high-pressure chamber without disrupting the pressure differential therebetween, comprising:
a tubular body converging at one end into a restricted orifice and diverging at the other end into an enlarged open end having an opening area greater than the opening area of said orifice, the areas being in a ratio of a range between 20:1 to 40:1, said valve being disposed with the enlarged open end in the low-pressure chamber and the orifice in the high-pressure chamber whereby said valve transfers material from a fluidized bed through a pressure differential of a range of 3 to 30 inches of water.

17. A material fluidizing apparatus comprising:
a high-pressure chamber of gaseous medium;
a low-pressure chamber of gaseous medium disposed above said high-pressure chamber;
a grid means disposed between said chambers maintaining a pressure differential therebetween, and passing gaseous medium from said high-pressure chamber into the low-pressure chamber to create a fluidized bed of material contained therein adjacent an upper surface of said grid means; and
a material transfer valve having a large open end and a small open end, said valve being mounted on said grid means with said large end projecting into said low-pressure chamber and said small end extending into said high-pressure chamber, said large open end having an area greater than the area said small open end, said areas being in a ratio having a range of 20:1 to 40:1 whereby said valve transfers material from said low-pressure chamber to said high-pressure chamber across a pressure differential of a range of 3 to 30 inches of water without any substantial disruption of the pressure differential.

UNITED STATES PATENT OFFICE
CERTIFICATE OF CORRECTION

Patent No. 3,558,111           Dated January 26, 1971

Inventor(s)     Hazelton H. Avery

It is certified that error appears in the above-identified patent and that said Letters Patent are hereby corrected as shown below:

Column 5, line 29; "he" should read --the--.

Column 8, line 23; insert --and-- after "means;"

line 30, change ";and" to read --,--.

Signed and sealed this 25th day of January 1972.

(SEAL)
Attest:

EDWARD M. FLETCHER, JR.
Attesting Officer

ROBERT GOTTSCHALK
Commissioner of Patents